United States Patent [19]
Deady

[11] Patent Number: 5,445,042
[45] Date of Patent: Aug. 29, 1995

[54] TRANSMISSION AND CONTROL WITH HYDRAULICALLY ACTUATED SYNCHRONIZERS

[75] Inventor: Robert B. Deady, Plymouth, Mich.

[73] Assignee: General Motors Corporation, Detroit, Mich.

[21] Appl. No.: 140,657

[22] Filed: Oct. 21, 1993

[51] Int. Cl.⁶ .................. F16H 61/18; F16H 3/083
[52] U.S. Cl. ........................... 74/329; 74/335; 477/130
[58] Field of Search .............. 74/335, 329; 477/127, 477/130, 131, 143

[56] References Cited

U.S. PATENT DOCUMENTS

| | | | |
|---|---|---|---|
| 4,262,554 | 4/1981 | Ahlen et al. | 477/131 X |
| 4,756,213 | 7/1988 | Mainquist et al. | 74/335 X |
| 4,901,603 | 2/1990 | Ishikawa | 477/131 |
| 5,092,187 | 3/1992 | Irwin | 74/335 |
| 5,129,274 | 7/1992 | Vukovich et al. | 74/335 |
| 5,172,604 | 12/1992 | Monette et al. | 74/335 |
| 5,335,562 | 8/1994 | Mastroianni et al. | 74/329 |

FOREIGN PATENT DOCUMENTS

| | | | |
|---|---|---|---|
| 45-15325 | 5/1970 | Japan | 477/130 |
| 55-40323 | 2/1980 | Japan | 477/130 |
| 58-46247 | 3/1983 | Japan | 477/131 |

Primary Examiner—Charles A. Marmor
Assistant Examiner—Nathan O. Jensen
Attorney, Agent, or Firm—Donald F. Scherer

[57] ABSTRACT

A countershaft type power transmission has a plurality of hydraulically actuated synchronizers which are selectively operable to establish the gear ratios in the transmission. Each synchronizer is effective to control one or more ratios and is positionable between neutral positions. A hydraulic control system is provided to control the movement of the synchronizers and to hydraulically force each synchronizer to neutral when it is not called upon for ratio establishment.

8 Claims, 11 Drawing Sheets

| FIG. 2A | FIG. 2B |
| --- | --- |
| FIG. 2C | FIG. 2D |
| FIG. 2E | FIG. 2F |

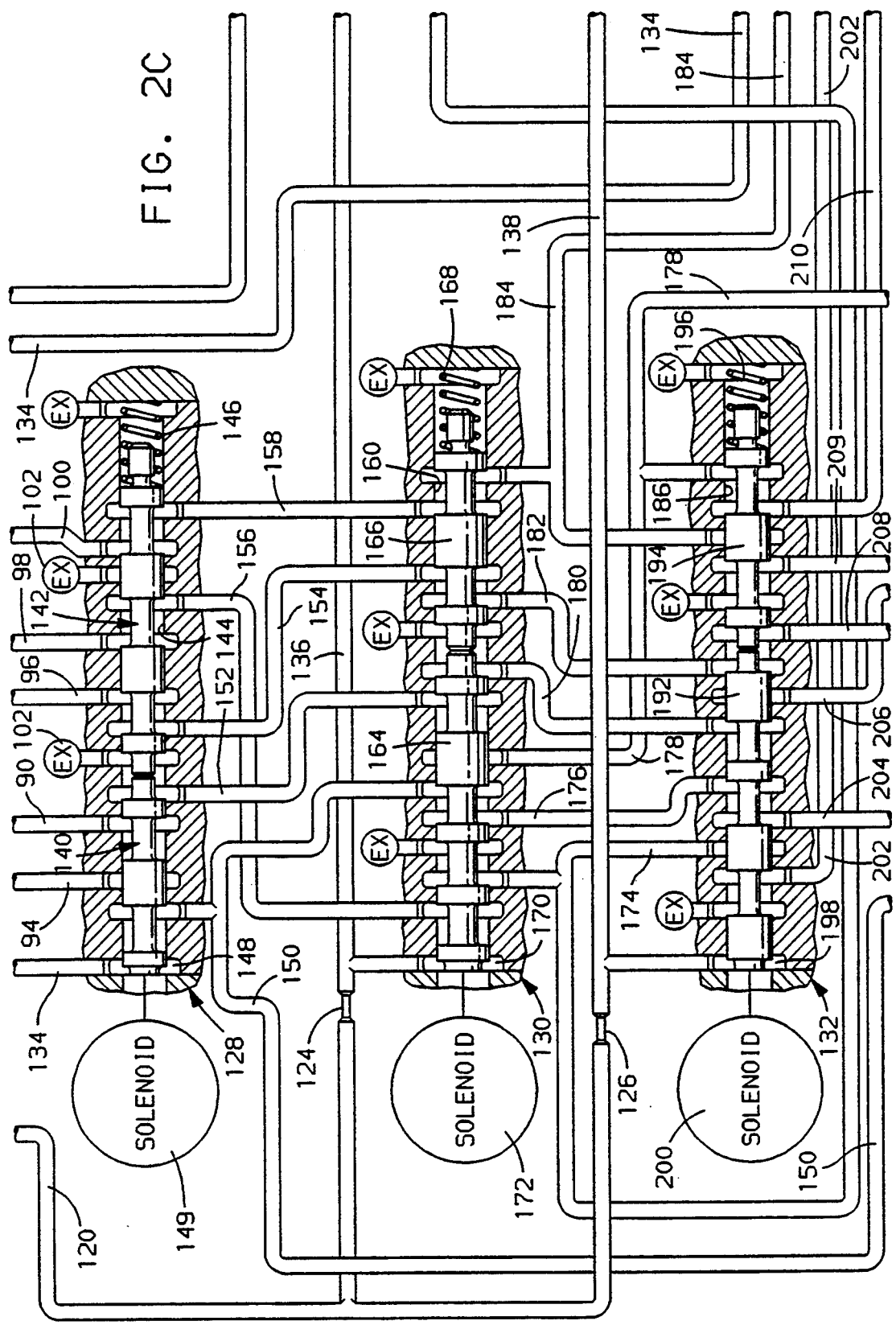

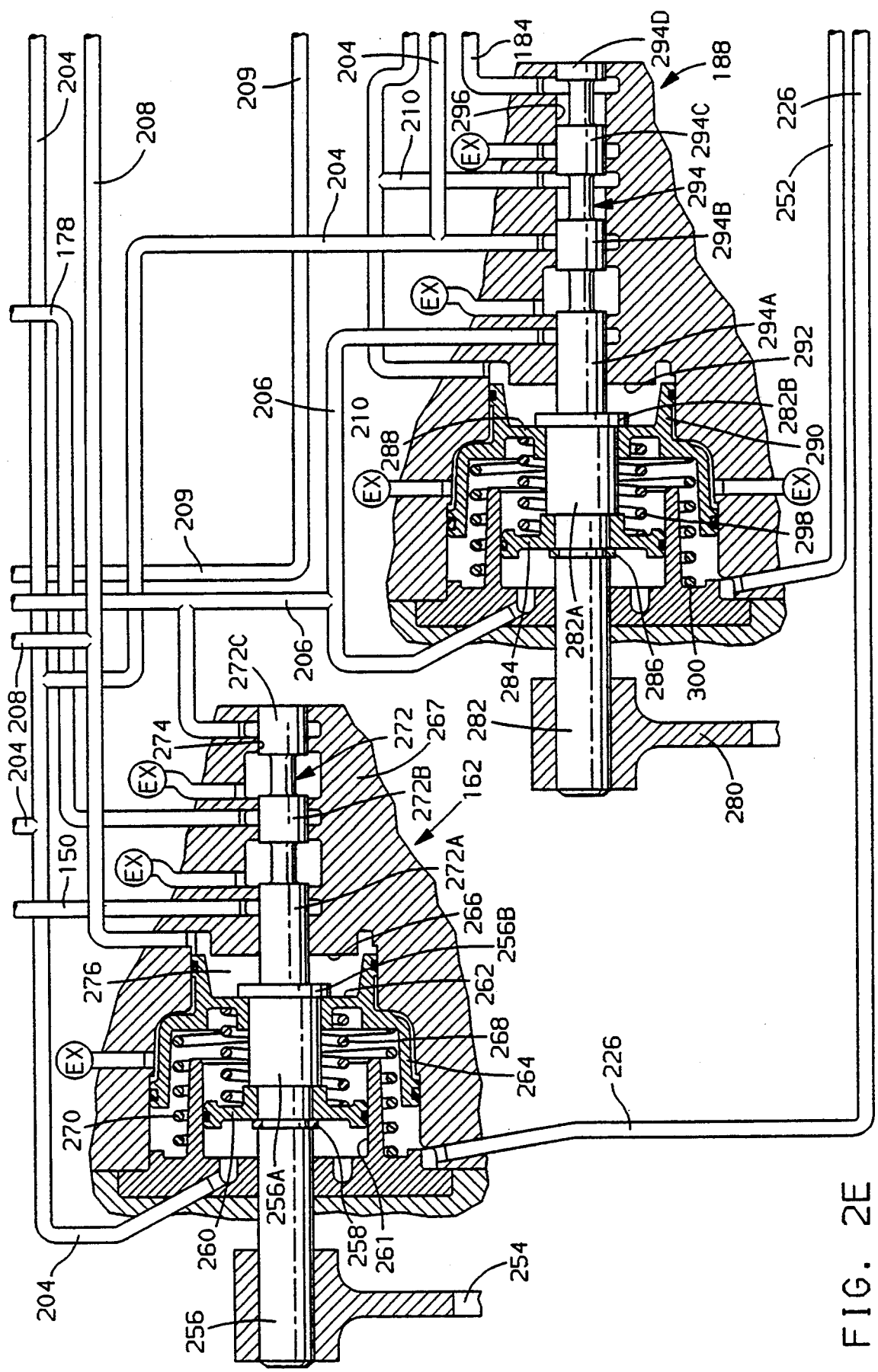

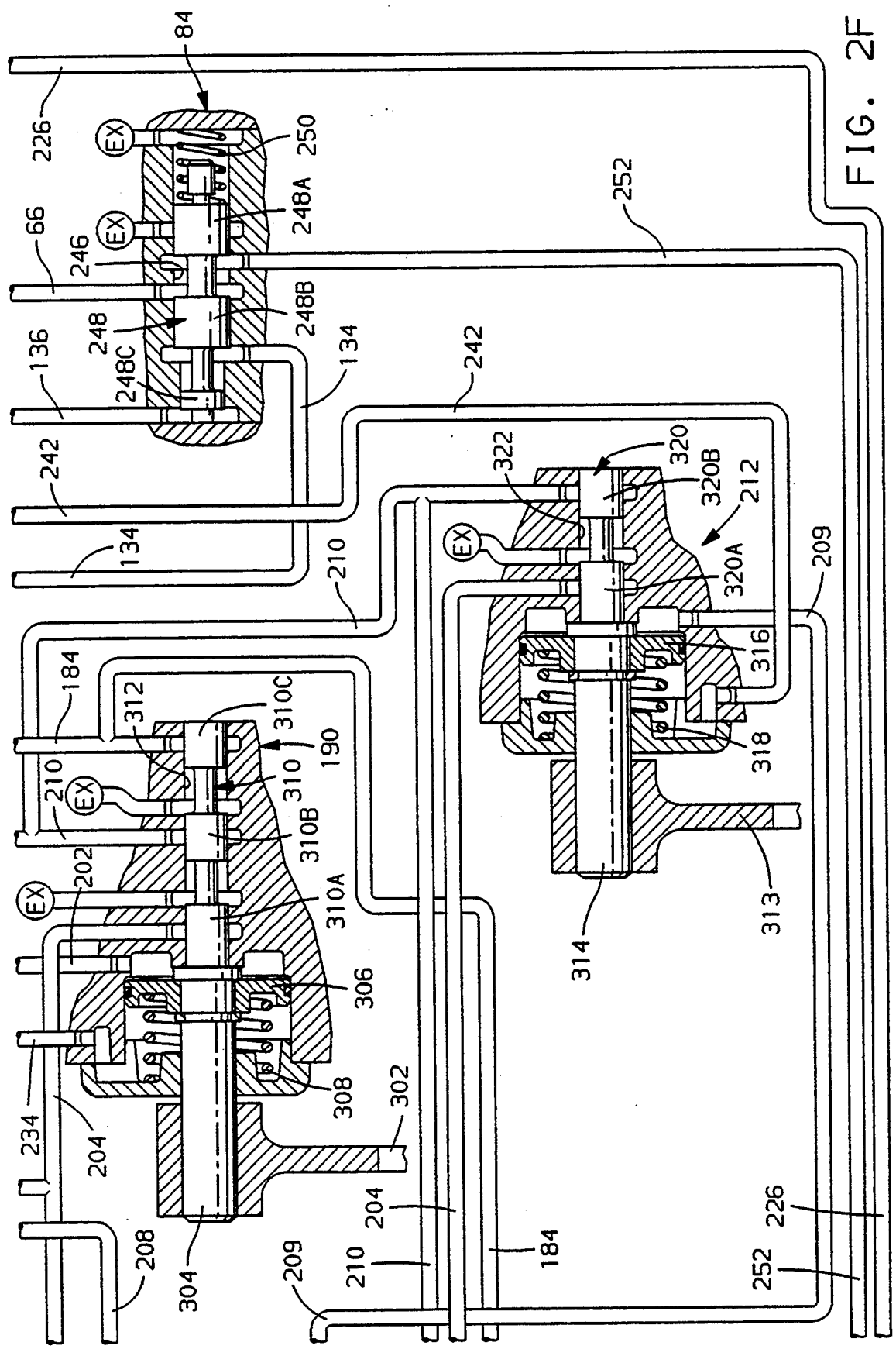

TRANSMISSION AND CONTROL WITH HYDRAULICALLY ACTUATED SYNCHRONIZERS

TECHNICAL FIELD

This invention relates to power transmission controls, and more particularly, to ratio interchange controls. Specifically, this invention relates to synchronizer controls in countershaft type power transmissions.

BACKGROUND OF THE INVENTION

Automatically shifted countershaft type transmissions provide improved overall efficiency when compared with planetary type fluid drive transmissions. The countershaft transmission can be operated with greatly reduced hydraulic fluid flow. Also, these transmissions employ a friction type input device which does not require continuous fluid pressure when engaged. This further improves the efficiency of the transmission.

SUMMARY OF THE INVENTION

A hydromechanical control mechanism is provided for the synchronizer mechanisms in a countershaft type transmission. The control includes servo mechanisms for controlling the synchronizers and valving to prevent the operation of more than one servo mechanism at any given time. The inactive servo mechanisms are hydraulically and spring set to neutral conditions until activated hydraulically to establish the desired ratio in the transmission.

It is an object of this invention to provide an improved transmission and control, wherein a plurality of synchronizer clutches are controlled individually in a ratio position or a neutral position, and wherein one synchronizer clutch is in a ratio position, the remaining synchronizer clutches are powered to respective neutral positions.

It is another object of this invention to provide an improved transmission and control, wherein a plurality of synchronizer clutches are controlled individually by servo mechanisms to either a ratio position or a neutral position, and wherein when one synchronizer clutch is disposed in a ratio position, the remaining synchronizer clutches are spring set and hydraulically held in a neutral position.

These and other objects and advantages of the present invention will be more apparent from the following description and drawings.

DESCRIPTION OF THE DRAWINGS

FIGS. 2A through 2F are diagrammatic representations of the valving and servo mechanisms used with the present invention.

DESCRIPTION OF AN EXEMPLARY EMBODIMENT

Figures 1, 2:
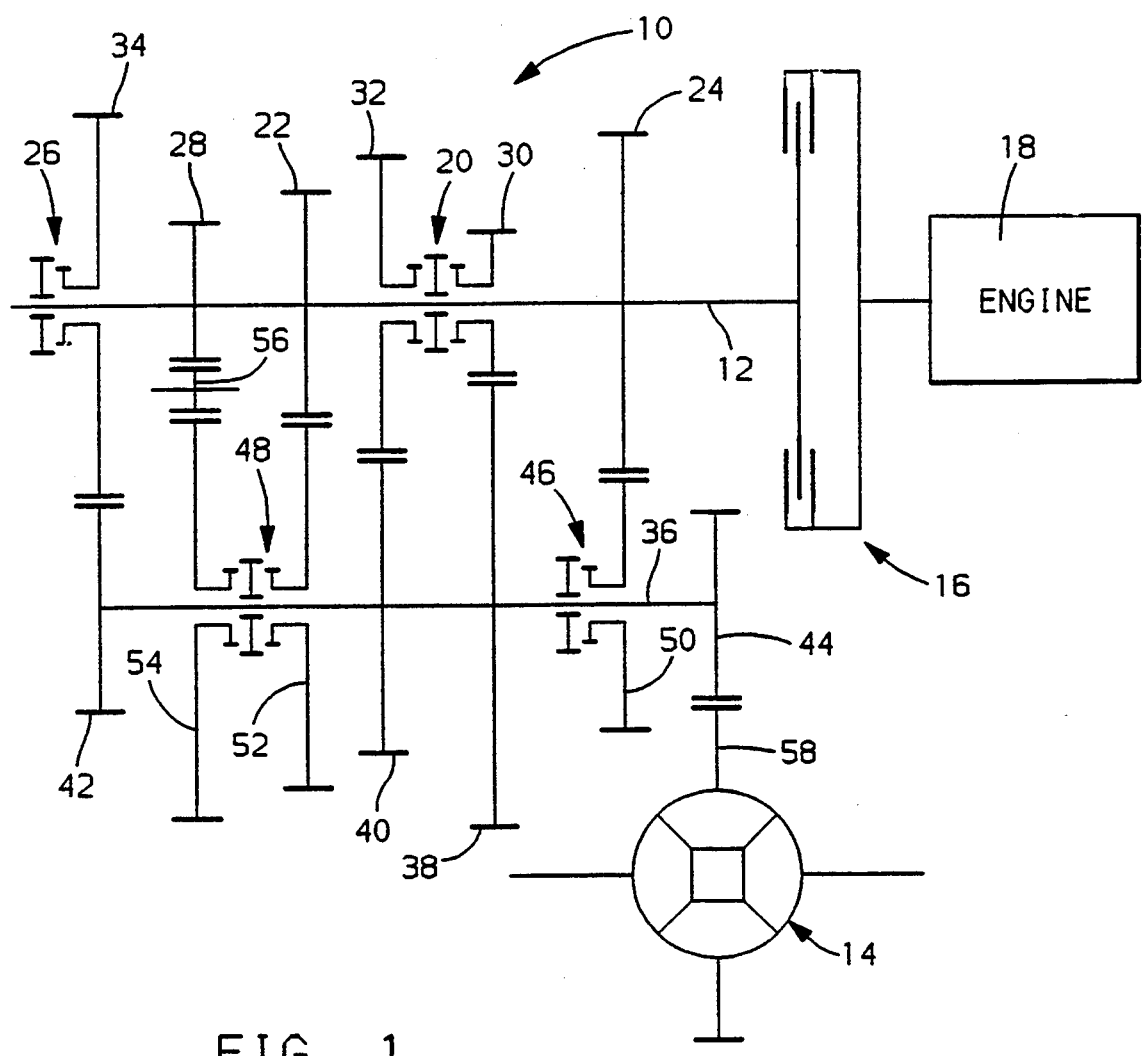
FIG. 1 is a schematic representation of a countershaft type transmission in which the present invention can be utilized.
FIG. 2 is a layout representation of the valving and servo mechanism shown in FIGS. 2A–2F which are utilized to control the transmission shown in FIG. 1.

The schematic diagram shown in FIG. 1 represents a countershaft type power transmission, generally designated 10, operable to provide five forward speeds and one reverse speed between a transmission input shaft 12 and a differential mechanism 14. The transmission input shaft 12 is selectively driven by a starting clutch 16 in a conventional internal combustion engine 18.

The transmission input shaft 12 has rotatably affixed therewith a 1-3 synchronizer 20, a second ratio input gear 22, a fourth ratio input gear 24, a fifth ratio synchronizer 26, and a reverse input gear 28. Rotatably supported on the input shaft 12 is a first ratio input gear 30, a third ratio input gear 32 and a fifth ratio input gear 34.

The 1-3 synchronizer 20 is operable to selectively connect the first or third ratio input gears 30, 32 with the input shaft 12 and the fifth ratio synchronizer 26 is selectively operable to connect the fifth ratio input gear 34 with the input shaft 12.

The transmission 10 further includes a transmission output shaft 36 which is disposed in parallel relationship with the input shaft 12 and has rotatably affixed therewith a first ratio output gear 38, a third ratio output gear 40, a fifth ratio output gear 42, and a final drive gear 44.

Also, rotatably affixed with the output shaft 36 is a fourth ratio synchronizer 46 and an R-2 synchronizer 48. The fourth ratio synchronizer 46 is operable to secure a fourth ratio output gear 50 to the transmission output shaft 36, and the synchronizer 48 is selectively operable to connect a second ratio output gear 52 and a reverse output gear 54 with the transmission output shaft 36.

The first ratio input gear 30 meshes with the first ratio output gear 38; the second ratio input gear 22 meshes with the second ratio output gear 52; the third ratio input gear 32 meshes with the third ratio output gear 40; the fourth ratio input gear 24 meshes with the fourth ratio output gear 50; the fifth ratio input gear 34 meshes with the fifth ratio output gear 42; and the reverse input gear 28 meshes with a reverse idler gear 56 which in turn meshes with the reverse output gear 54. The final drive gear 44 meshes with a final drive gear 58 which provides an input member for the conventional differential 14.

As is well known, the judicious selection of the synchronizers will permit power transmission at various ratios between the transmission input shaft and the differential 14. The clutch 16 permits disengagement of the transmission from the engine 18 during starting and during shifting or ratio interchanges. As is also well known, it is not desirable to engage more than one synchronizer at any given time.

To permit hydraulic control of the synchronizers, the valving mechanism, shown in FIG. 2, is provided. The control mechanism shown in FIG. 2 includes a conventional variable displacement pump 60 which draws fluid from a sump or reservoir 62 through a filter 64 for delivery to a main passage 66. Fluid pressure in the main passage 66 is controlled by a conventional pressure regulator valve 68.

The conventional pressure regulator valve 68 is designed to first provide a pressure level which can be utilized to control the shifting of the synchronizers and, after this pressure function is satisfied, provide pressure flow for controlling the clutch 16 via a passage 70. When the pressure and flow requirement of passage is fulfilled, the pressure regulator 68 delivers pressurized fluid via a passage 72 back to the pump 60 which is effective to reduce the displacement of the pump, such that excess fluid is not delivered to the system.

The main passage 66 delivers pressurized fluid to a manual valve 74, an actuator feed limit valve 76, a 1/3 servo disengage valve 78, a fourth servo disengage valve 80, a fifth servo disengage valve 82, and a 2/R servo disengage valve 84.

Figure 2A:
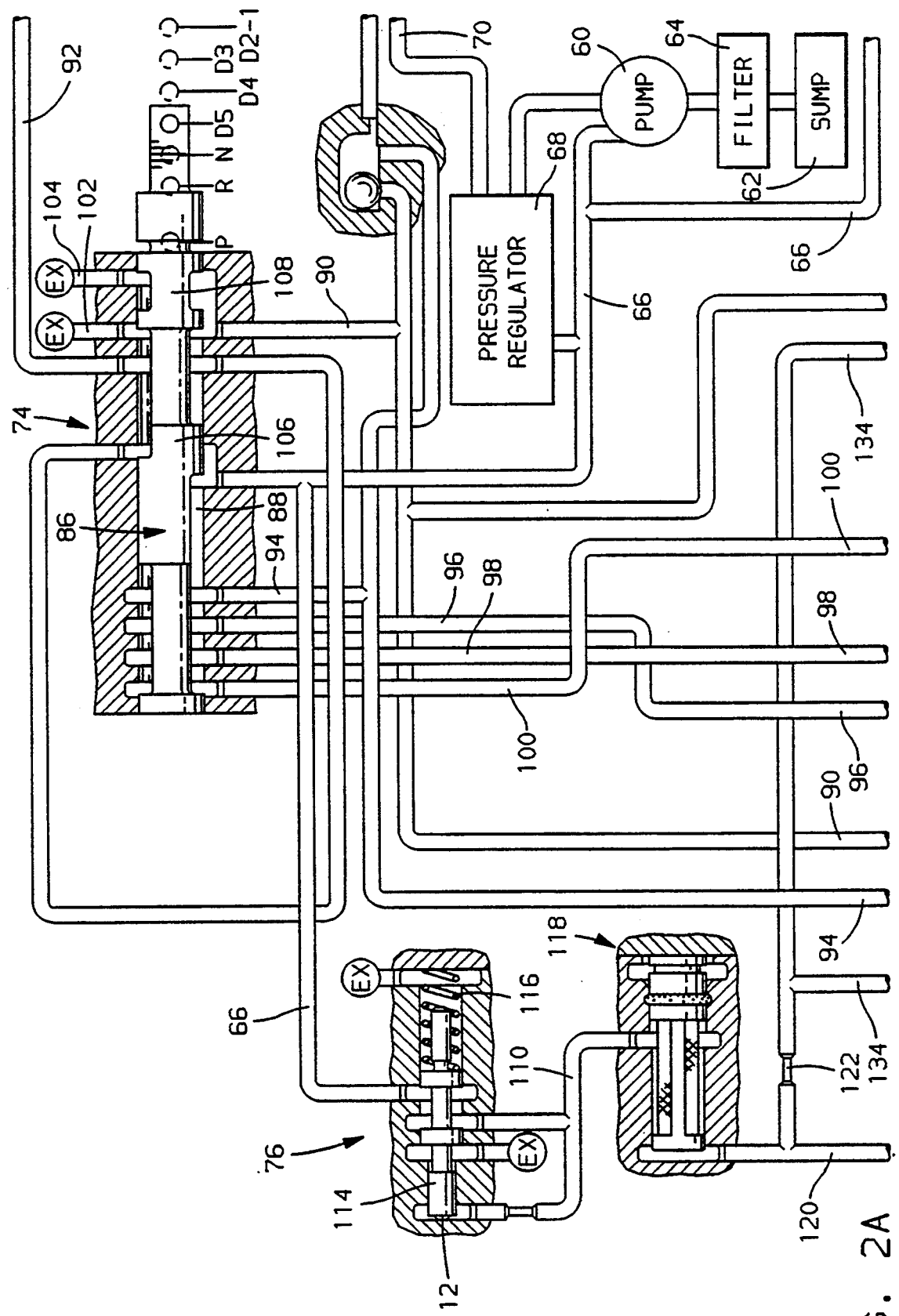

As best seen in FIG. 2A, the manual valve 74 includes a linearly movable valve spool 86 which is slidably disposed in a valve bore 88. The valve spool 86 is movable to a plurality of operating positions; namely, Reverse (R), Neutral (N), Forward (D5), Forward (D4), Forward (D3) and Forward (D2-1). The valve spool 86 is also movable to a Park position (P). The valve spool 86 is shown in the D5 position.

The valve bore 88 is in fluid communication with the passage 66 from the pump 60 and pressure regulator 68, as previously mentioned. The valve bore 88 is also in fluid communication with a Reverse passage 90, a Park-Neutral passage 92, a D2-1 passage 94, a D3 passage 96, a D4 passage 98, and a D5 passage 100.

The valve spool 86 is manipulable to provide controlled pressurization of the various passages connected therewith or to permit exhausting thereof in a well known manner. In the D5 position shown, the passages 94, 96, 98 and 100 are all pressurized from the main passage 66 while the Park-Neutral passage 92 and Reverse passage 90 are exhausted through passages 102 and 104. When the valve spool 86 is moved rightward to the D4, D3, D2-1 positions, the passages 100, 98, 96, are exhausted sequentially as the valve spool 86 is moved from the respective Drive position. When the valve spool is moved to the Neutral position, the passages 94, 96, 98 and 100 are disconnected from the line passage 66 through a central land configuration 106 and the Reverse passage 90 is exhausted at the exhaust passage 102.

The Park-Neutral passage 92 is connected with the passage 66 when the valve spool is in the neutral condition. When the valve spool is moved to the Reverse position, the Reverse passage 90 is connected with the passage 66 between the land configuration 106 and another land configuration 108.

At this time, the Park-Neutral passage 92 is also pressurized while the forward drive passages are exhausted through the end of valve bore 88. The Park-Neutral passage 92 is disposed for fluid communication with the 1/3 servo disengage valve 78 to maintain that valve in the spring set position shown.

The actuator feed valve 76 receives fluid pressure via passage 66 and delivers a reduced fluid pressure to a passage 110. The pressure in passage 110 is determined by the fluid pressure on an end 112 of a spool valve 114 as opposed by a compression spring 116. This reduced fluid pressure in passage 110 is delivered through a conventional filter 118 to a solenoid feed passage 120.

The solenoid feed passage 120 is connected through restrictions 122, 124, 126, respectively, to solenoid controlled shift valves 128, 130 and 132, respectively. The solenoid shift valves are operable to control the selective operation of the synchronizers shown in FIG. 1.

The solenoid shift valve 128 is connected downstream of the restriction 122 by a first solenoid signal passage 134 which is also connected with the 2/R disengage valve 84. The second solenoid shift valve 130 is connected downstream of the restriction 124 to a second solenoid signal passage 136 which is also connected with the 1/3 servo disengage valve 78, the fourth servo disengage valve 80 and the 2/R disengage valve 84. The third solenoid shift valve 132 is connected with a third solenoid signal passage 138 downstream of the restriction 126. The third solenoid signal passage 138 is also connected with the 1/3 servo disengage valve 78, the fourth servo disengage valve 80 and the fifth servo disengage valve 82.

The first solenoid shift valve 128 has a pair of spool valves 140, 142 slidably disposed in a valve bore 144 and urged leftward therein by a compression spring 146. A fluid pressure chamber 148 disposed at the left end of valve spool 140 is pressurizable in response to the energization of a solenoid 149 to cause the valve spools 140 and 142 to move rightward against the spring 146.

The valve bore 144 is in fluid communication with the D5 passage 100, the D4 passage 98, the D3 passage 96, the Reverse passage 90 and the D2-1 passage 94 and a pair of exhaust connections 102. All of the exhaust connections are marked "EX" and are connected with the sump 62 through either the internal mechanism of the transmission or through lube passages in the various shafts and then to the transmission. Therefore, the exhaust passages will not be given reference numerals.

The valve bore 144 is also in fluid communication with a plurality of passages 150, 152, 154, 156 and 158. Each of these passages is in fluid communication with a valve bore 160 of the solenoid shift valve 130. The passage 150 is also in fluid communication with a 1/3 servo control mechanism 162.

The solenoid valve 130 has a pair of valve spools 164, 166 slidably disposed in the valve bore 160. The valve spools 164 and 166 are urged leftwardly by a compression spring 168 and are controlled in rightward movement by fluid pressure in a chamber 170 which is controlled by a solenoid 172.

The valve bore 160 is also in fluid communication with a plurality of passages 174, 176, 178, 180, 182 and 184. Each of these passages is also in fluid communication with a valve bore 186 of the shift valve 132. Passage 178 is also in fluid communication with the 1/3 servo control 162. The passage 174 is in fluid communication with the fifth servo disengage valve 82. The passage 184 is in fluid communication with a 2/R servo mechanism 188 and a fourth ratio servo control mechanism 190.

The shift valve 132 includes a pair of valve spools 192 and 194 slidably disposed in the bore 186 and urged leftwardly therein by a compression spring 196. A pressure control chamber 198 is operable in response to a control solenoid 200 to establish a pressure to move the valve spools 192 and 194 rightward against the spring 196.

The bore 186 is also in fluid communication with a plurality of fluid passages 202, 204, 206, 208, 209 and 210. The passage 202 is in fluid communication with the fourth servo mechanism 190. The passage 204 is in fluid communication with the 1/3 servo control 162, the fourth ratio servo control mechanism 190 and the 1/3 servo disengage valve 78. The passage 206 is in fluid communication with the 2/R servo mechanism 188 and the 1/3 servo control 162. The passage 208 is in fluid communication with the 1/3 servo control 162 and the 1/3 servo disengage valve 78. The passage 209 is in fluid communication with a fifth servo mechanism 212. The passage 210 is in fluid communication with the fourth servo mechanism 190, the fifth servo mechanism 212 and the 2/R servo mechanism 188.

Figure 2B:
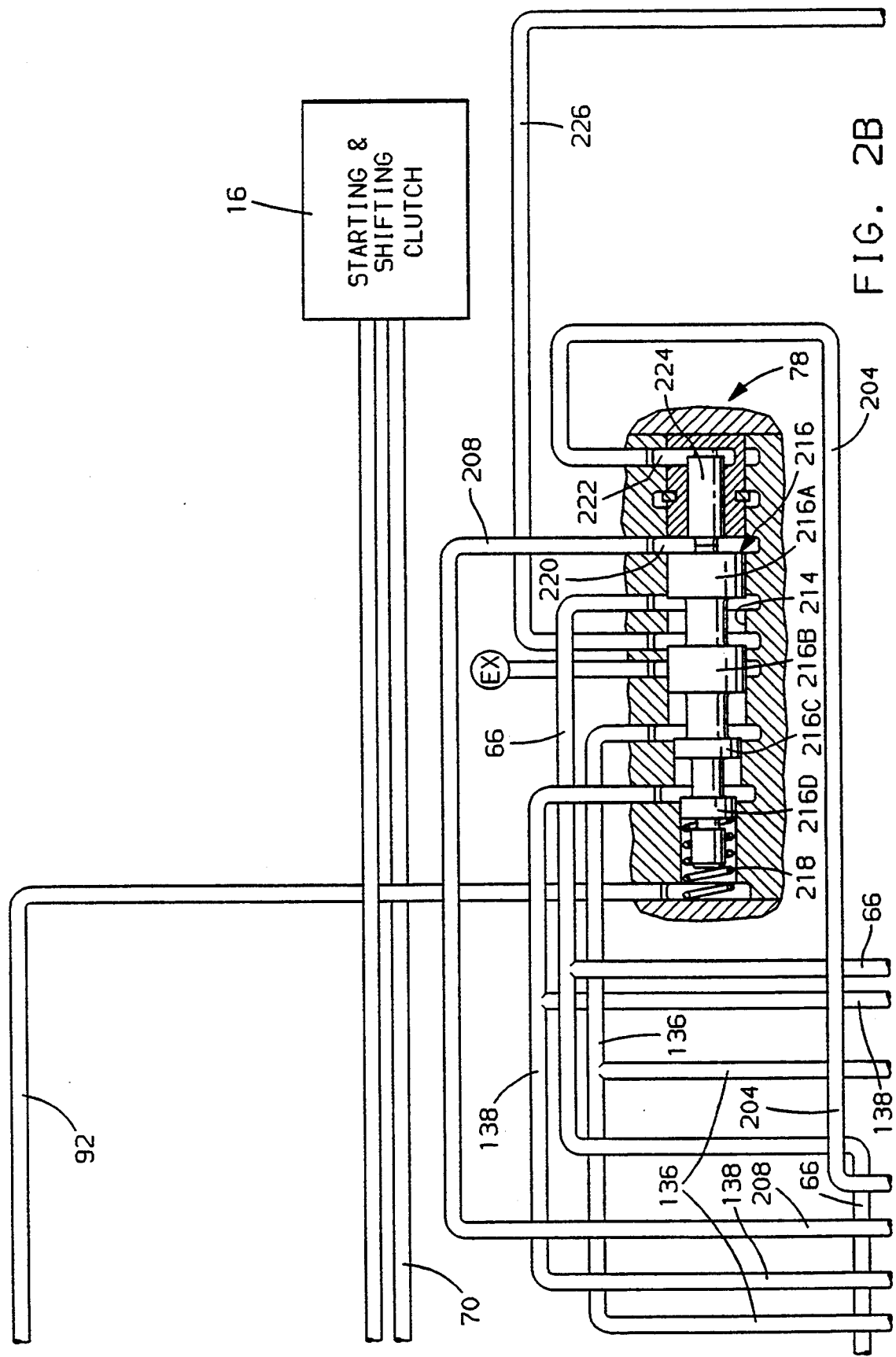

The 1/3 servo disengage valve 78 has a step diameter bore 214 in which is disposed a step diameter valve spool 216. The valve spool 216 is urged rightward, as seen in FIG. 2B, by a compression spring 218. The valve spool 216 can be urged leftward against the spring 218 by fluid pressure provided through passage 208 to a chamber 220, or by fluid pressure provided to a chamber 222 from the passage 204. Pressure in the chamber 222 operates on a small plug valve 224 which is effective to urge the valve 216 leftward against the spring 218.

In the spring set position shown, the fluid pressure in passage 66 is connected between lands 216A and 216B to a passage 226, which is disposed in fluid communication with the 1/3 servo control 162.

The valve spool 216 can be held in the spring set position shown by fluid pressure in the signal passage 138 which cooperates with the spring 218 at a differential area between lands 216C and 216D, and also by fluid pressure in passage 136 which operates on a differential area between lands 216C and 216B.

The passages 136 and 138 are pressurized whenever the solenoids 172 and 200 are not energized. These passage 136 and 138 are exhausted whenever the solenoids 172 and 200 are energized to permit exhausting of the chambers 170 and 198, respectively.

The fourth servo disengage valve 80 has a step diameter bore 228 in which is slidably disposed a step diameter valve spool 230. The step diameter valve spool 230 is urged leftward by a spring 232 and is assisted in this direction by fluid pressure in the passage 90 which is pressurized whenever the valve 74 is in the reverse position.

Figure 2D:
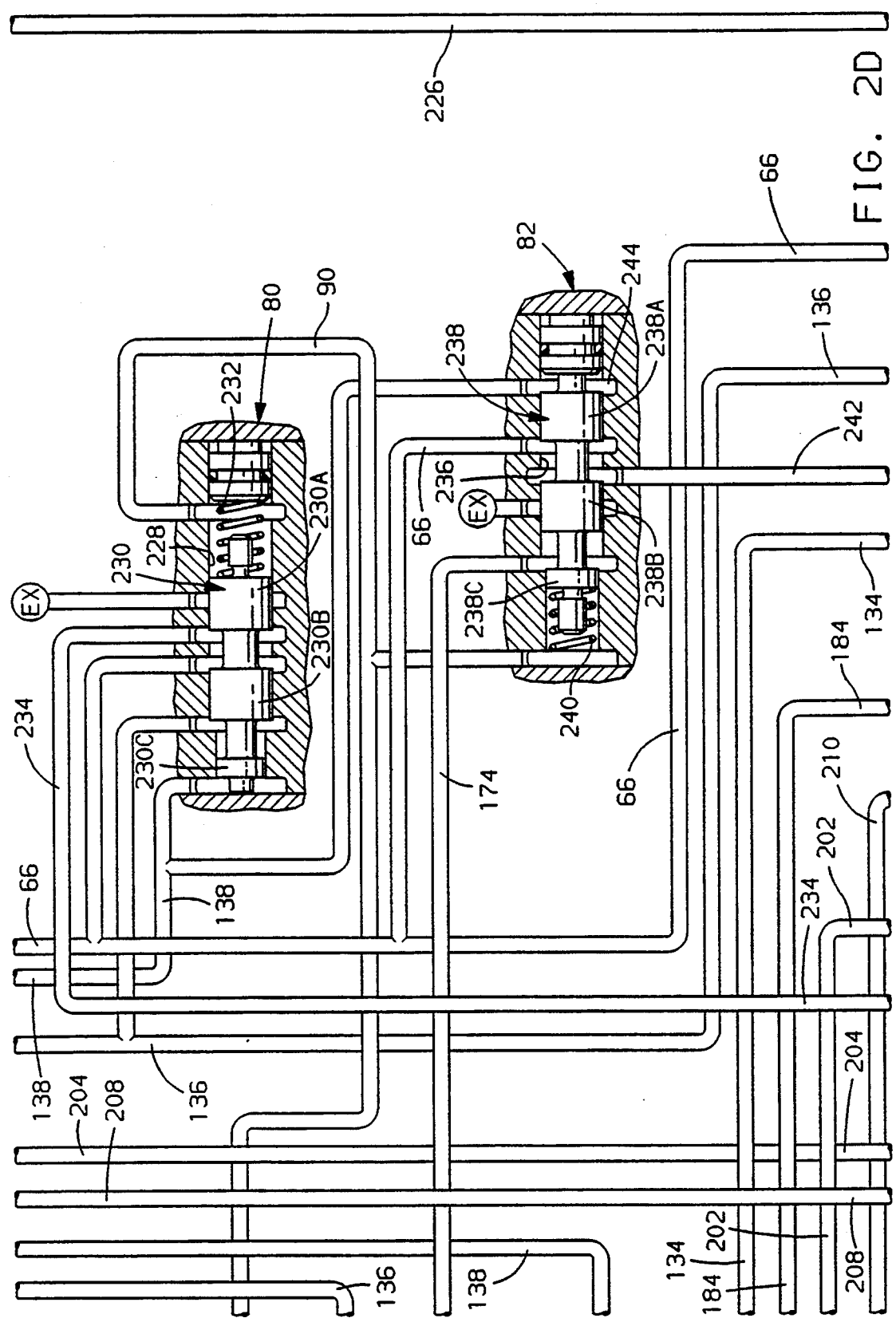

The passage 66 is connected between a pair of lands 230A and 230B with a passage 234 which is connected with the fourth ratio servo control 190. The valve spool 230 can be rightward against the spring 232 whenever fluid pressure is present in passage 138 or passage 136. Pressure is available in passages 136, 138 whenever solenoids 172 and 200 are not energized, such that fluid pressure is also present in the chambers 170 and 198. When the valve spool 230 is shifted rightward by pressure in passage 136 acting on a differential area between lands 230b and 230c or pressure in passage 138 acting on land 230c, the passage 234 is connected to exhaust while the passage 236 is closed by valve land 230b The fifth servo disengage valve 82 includes a step diameter bore 236 in which is slidably disposed a step diameter valve spool 238 which is urged to the right, as seen in FIG. 2D, by a spring 240. In the spring set position shown, fluid pressure in passage 66 is connected between valve lands 238A and 238B with a passage 242 which in turn is connected With the fifth servo control 212.

The valve spool 238 can be urged leftward against the spring 240 by fluid pressure in a chamber 244 which is connected with the passage 138. Passage 138 is pressurized whenever the solenoid 200 is actuated to establish a control pressure in chamber 198.

Fluid pressure in passage 174 is active on a differential area between lands 238B and 238C to assist the spring 240 in urging the valve spool 238 rightward, and fluid pressure in passage 90 operates on the land 238C to also assist the spring 240 in urging the valve spool 238 rightward.

The 2/R disengage valve 84 has a step diameter valve bore 246 in which is slidably disposed a step diameter valve spool 248. The valve spool 248 is urged leftward, as seen in FIG. 2F, by a spring 250, such that fluid pressure in passage 66 is passed between valve lands 248A and 248B to a passage 252 which is connected with the 2/R servo mechanism 188.

The differential area between lands 248B and 248C is in fluid communication with the passage 134 which is pressurized whenever the solenoid 149 is energized, thereby establishing a control pressure in the chamber 148. Fluid pressure in passage 136 will act on the valve land 248C to urge the valve spool 248 rightward against the spring 250 whenever fluid pressure is available as controlled by the solenoid 172.

Figure 3A:
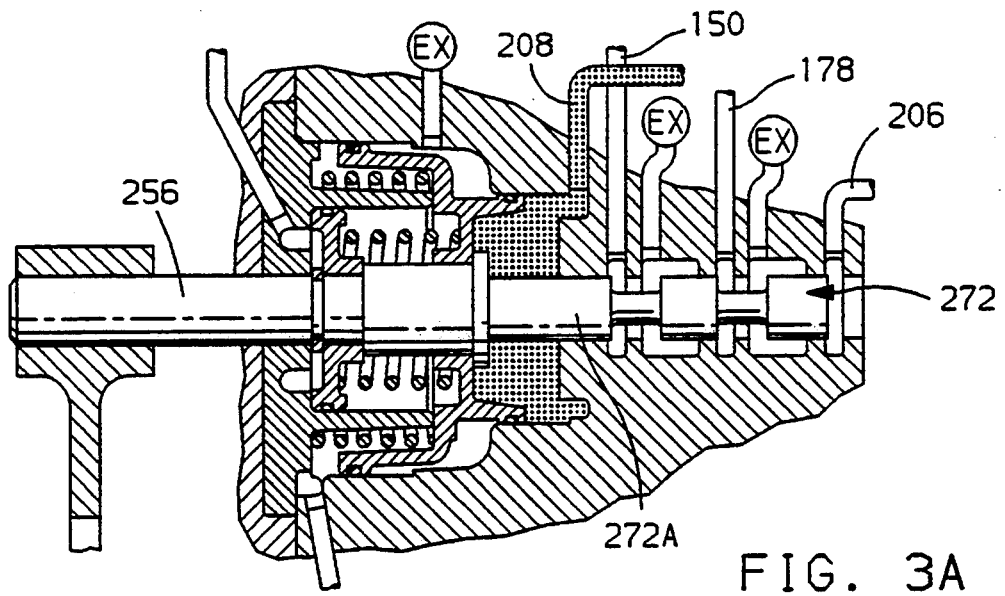
FIGS. 3A through 3C are diagrammatic representations of a servo mechanism for controlling the 1/3 ratio selector.
Figure 3B:
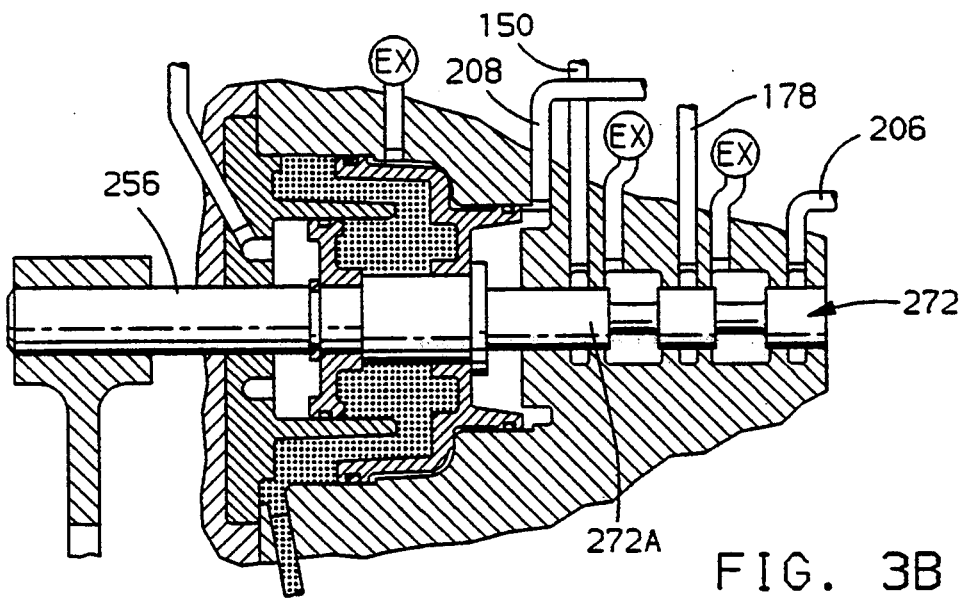
Figure 3C:
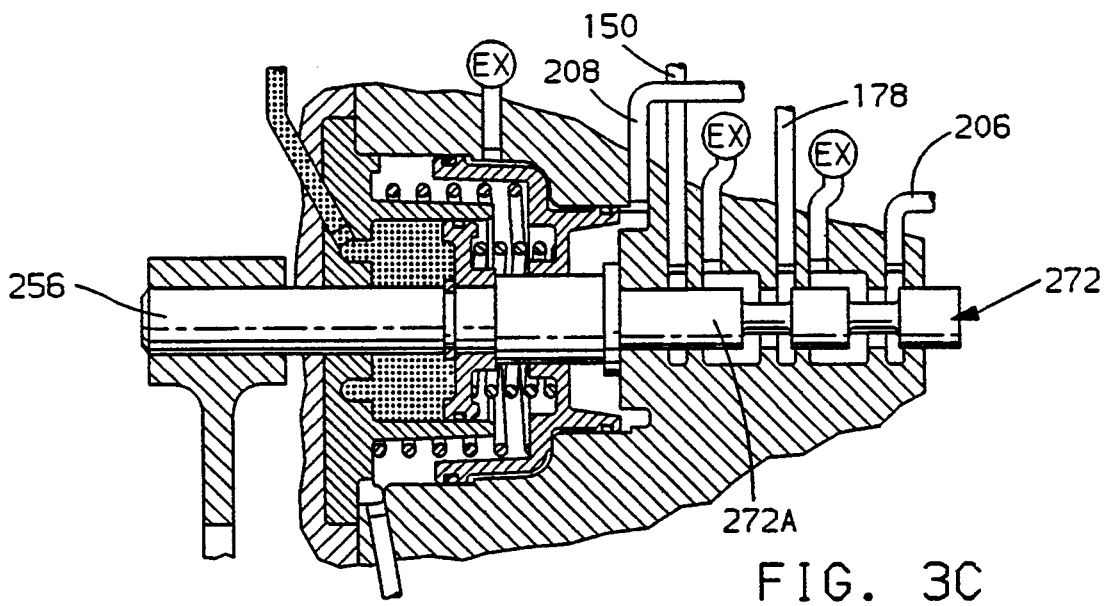

The 1/3 servo control 162 is effective to control the longitudinal movement of a shift fork 254 which is operatively connected to control the positioning of the 1-3 synchronizer 20 which selectively establishes a drive connection between the first input gear 30 or the third input gear 32, respectively, and the input shaft 12. The shift fork 254 is secured to a rod 256 which is secured by a snap ring 258 and a shoulder 256A to a piston 260 which is slidably disposed in a fluid chamber 261, which in turn is in fluid communication with the passage 204. The rod 256 has a shoulder 256B which abuts a wall 262 on a piston 264 in the neutral position of the servo 162, as shown in FIGS. 2E and 3B. The shoulder 256B is urged into abutment with a wall 266 formed in a housing 267 whenever the rod 256 is moved rightward by fluid pressure in passage 204 acting on the piston 260, as shown in FIG. 3C.

The piston 260 and the piston 264 are urged to separate by a compression spring 268, and the piston 264 is urged into abutment with the housing 267 by a compression spring 270.

The rod 256 also incorporates a valve portion 272 which is slidably disposed in a valve bore 274. The valve portion 272 has three equal diameter valve lands 272A, 272B and 272C which are effective to control the fluid pressure in passages 150, 178 and 206, respectively.

In the position shown, the valve lands close the respective passages. This is the Neutral condition of the servo mechanism 162. The fluid pressure in passage 204, and therefore chamber 261, will cause the rod 256 to move rightward to establish the first ratio position within the transmission, and also to cause the valve portion 272 to exhaust fluid pressure in the passages 206 and 178. The valve land 272A will continue to close the passage 150.

Fluid pressure in passage 208, and therefore the chamber 276 formed between the piston 264 and the housing, will cause the rod 256 to move leftward to establish the third ratio position within the transmission. In this position, the passages 150, 178 and 206 are all exhausted by the valve portion 272.

When fluid pressure is admitted to passage 226, it is directed between the pistons 264 and 260 to urge the rod 256 to the Neutral position shown in FIG. 3B and in FIG. 2E. In this position, the valve portion 272 blocks the passages 150, 178 and 206.

The 2/R servo mechanism 188, shown in FIGS. 2E and FIGS. 4A, 4B and 4C, is operable to control the synchronizer 48 through a shift rod 280 which is connected with a rod 282. The rod 282 is connected to a piston 284 by a snap ring 286 and a shoulder 282A. The rod 282 also has a shoulder portion 282B which is movable to abut a wall 288 on a piston 290 and a wall 292 formed on the housing.

The rod 282 also has a valve portion 294 which is slidably disposed in a bore 296, and is comprised of four spaced valve lands 294A, 294B, 294C and 294D. These lands are effective to control fluid pressure in the passages 206, 204, 210 and 184, respectively. The pistons 290 and 284 are urged to separate by a compression spring 298, while the piston 290 is urged by a spring 300 rightward into abutment with a wall of the housing.

Figure 4A:
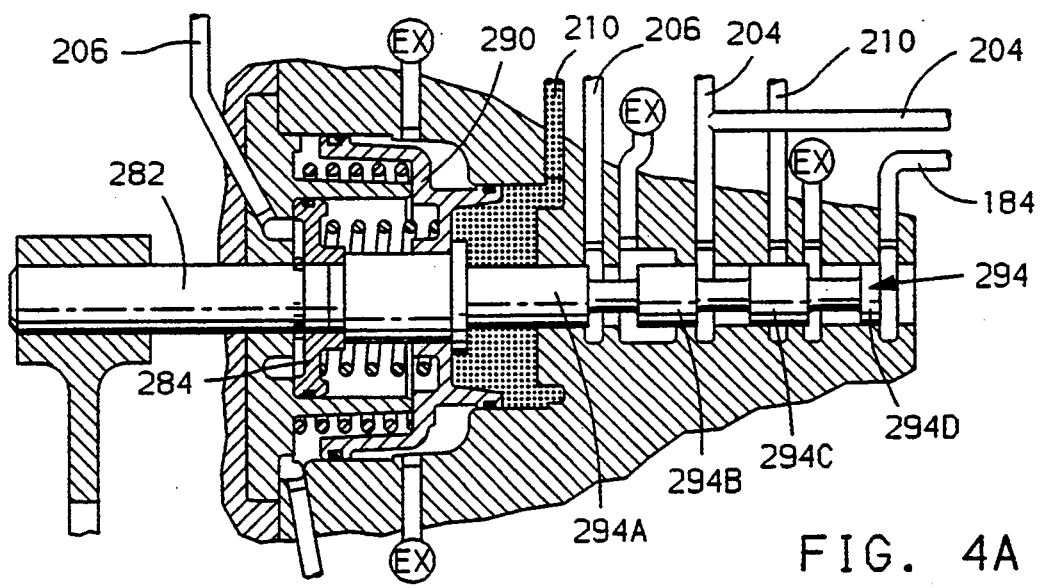
FIGS. 4A through 4C are a diagrammatic view of the various positions of the servo actuator controlling the 2-r servo mechanism.
Figure 4B:
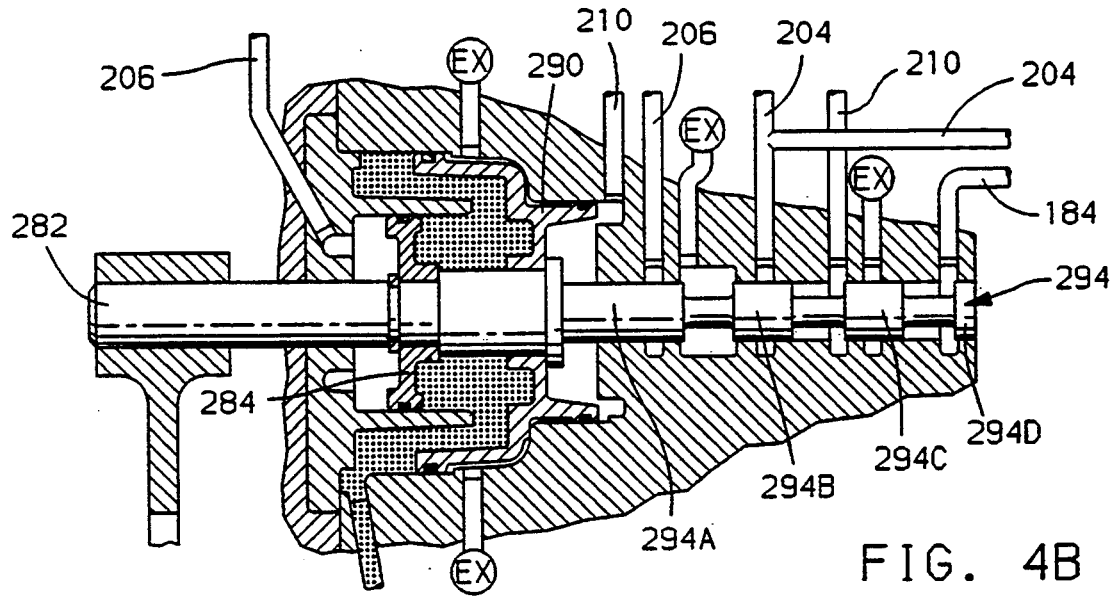

In the spring set position shown in FIGS. 2E and 4B, the 2/R servo mechanism 188 is in the Neutral position.

To shift the transmission to establish the second ratio, the passage 210 is pressurized thereby urging the piston 290 leftward along with the piston 284 and the rod 282. In this position, the passage 210 is closed by the valve land 294C and the passage 204 is closed between the lands 294C and 294B while the passages 206 and 184 are exhausted.

Figure 4C:
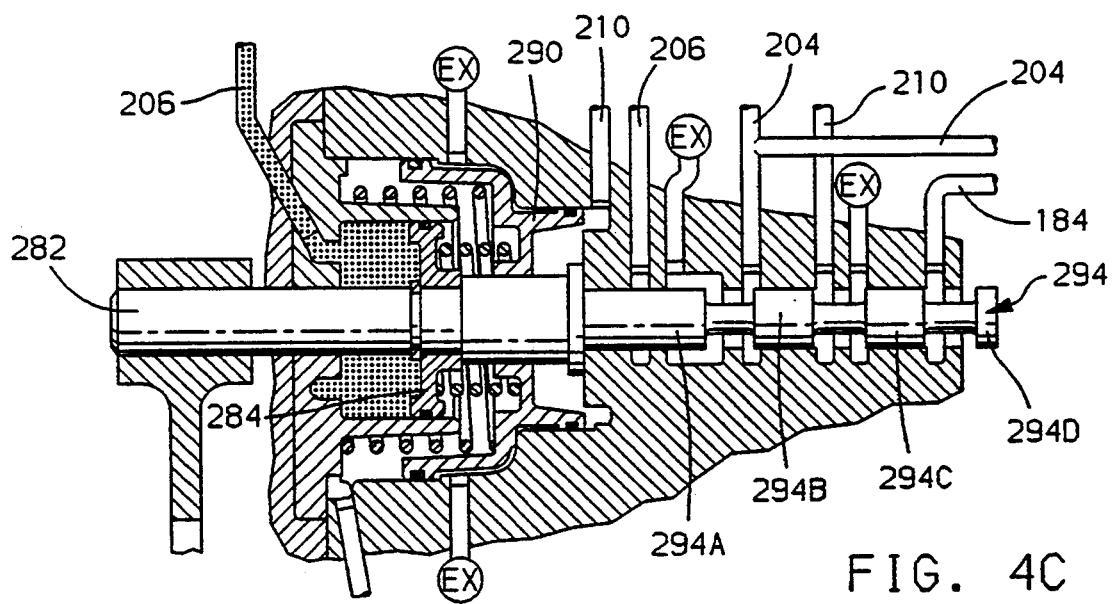

To establish the Reverse position in synchronizer 48, the piston 284 is pressurized by fluid pressure passage 206, thereby urging the rod 282 rightward to the position shown in FIG. 4C. In this position, the valve portion 294 exhausts the fluid pressure in passages 204, 210 and 184 while closing the passage 206 with the valve land 294A.

Figure 5A:
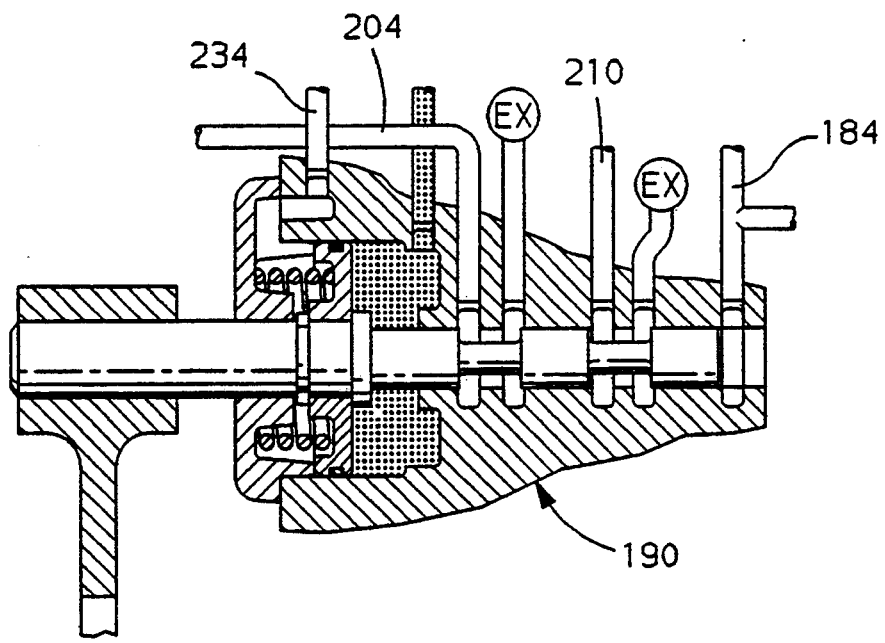
FIGS. 5A and 5B are diagrammatic representations of the servo mechanism controlling the fourth ratio within transmission.
Figure 5B:
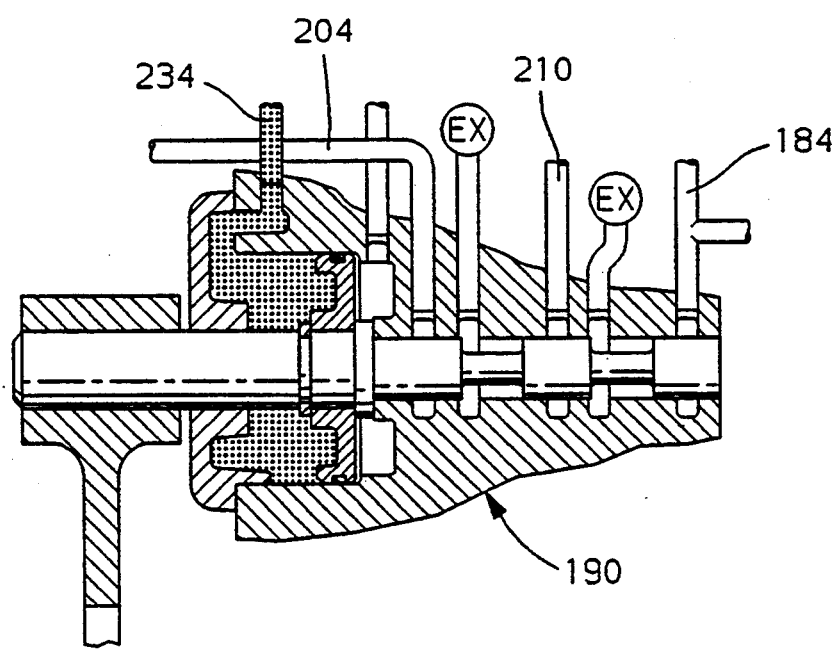

The fourth servo mechanism 190 is shown in FIGS. 2F, 5A and 5B. In FIGS. 2F and 5B, the servo mechanism 190 is in the Neutral position, and in FIG. 5A the servo mechanism has been shifted to the fourth position, such that the synchronizer 46 will condition the transmission 10 to provide the fourth forward ratio between the input and output.

The fourth servo mechanism 190 has a shift fork 302 which is secured to a rod 304. The rod 304 has secured thereto a piston 306 in a manner similar to that described above for the 1/3 servo mechanism 162 and the 2/R servo mechanism 188. The piston 306 is urged to the right, as seen in the drawings, by a compression spring 308. The rod 304 includes a valve portion 310 having three equal diameter lands 310A, 310b and 310c slidably disposed in a valve bore 312. The valve lands are effective to control fluid pressure in passages 204, 210 and 184, respectively.

In the spring set or Neutral position, when fluid pressure is supplied from passage 234, the valve portion 310 is effective to close all of the passages.

In the fourth ratio position, when fluid pressure is admitted at passage 202 to urge the piston and rod 304 leftward, as shown in FIG. 5A, the valve portion is effective to exhaust the passages.

Figure 6A:
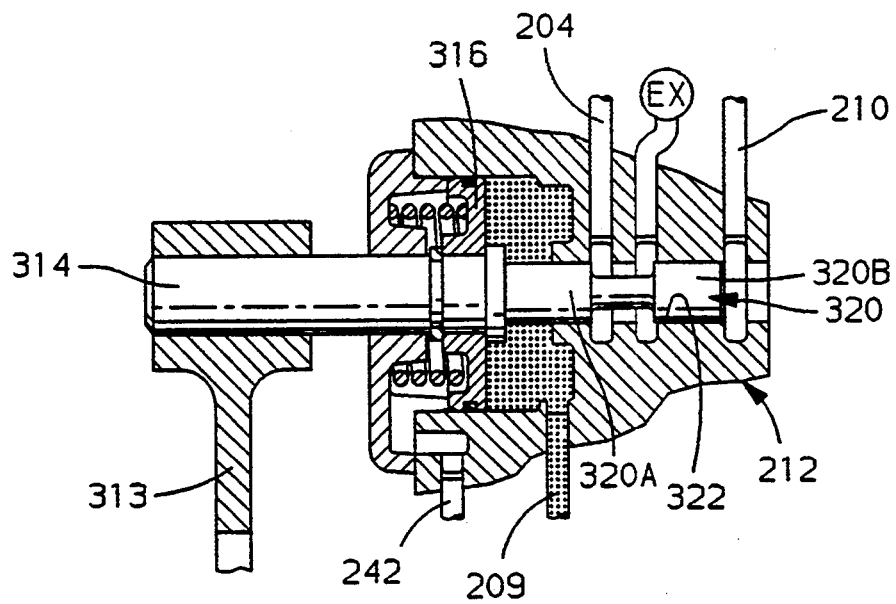
FIGS. 6A and 6B are diagrammatic representations of the positions of the fifth servo mechanism for the transmission.
Figure 6B:
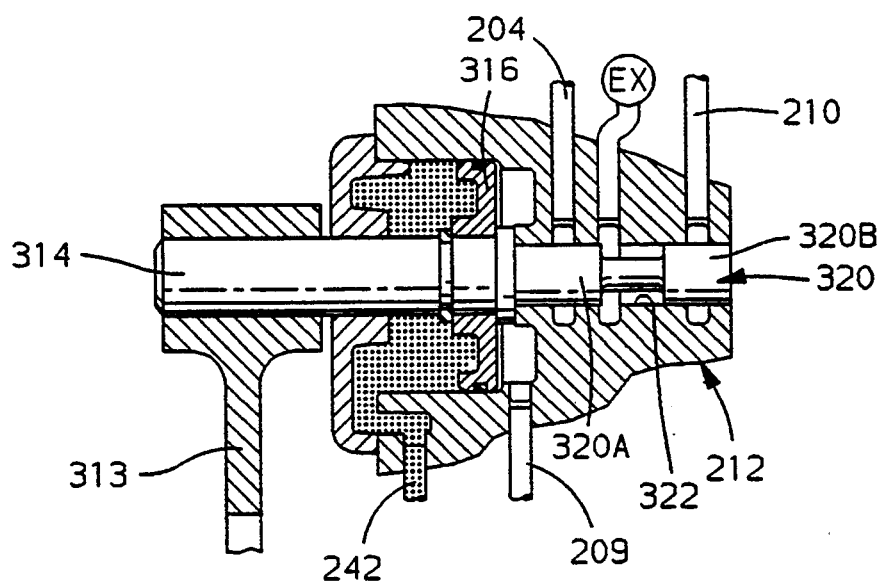

The fifth servo mechanism 212 is shown in FIGS. 2F and FIGS. 6A and 6B. This servo mechanism is similar in construction to the fourth servo 190. The fifth servo 212 has a shift fork 313 which is effective to control the position of the synchronizer 26 to establish either a Neutral or the fifth ratio in the transmission. The shift fork 313 is controlled by a shift rod 314 which is operatively connected with a piston 316 in a manner similar to that described for the previously described servos.

The piston 316 and shift rod 314 are urged rightward, as viewed in the drawings, by a compression spring 318 to the Neutral position shown in FIGS. 2F and 6B. This Neutral position is enforced by fluid pressure in the passage 242, which as seen in FIG. 6B, operates on the left side of the piston 316. The piston 316 is urged leftward to move the shift fork 313 to the fifth position by fluid pressure in the passage 209. The rod 314 has a valve portion 320 comprised of valve lands 320A and 320b slidably disposed in a bore 322. The valve lands are effective to provide control of fluid pressure in the passages 210 and 204.

In the fifth ratio position, when the fluid pressure in passage 209 is operative to move the shift fork 312 to the left, the passages are exhausted. In the Neutral position, shown in FIG. 6B, the fluid passages 204 and 210 are closed.

Thus, it is evident that the servo control mechanisms 162, 188, 190 and 212 are effective to establish the first through fifth forward ratios and the Reverse ratio in the transmission 10. It should also be apparent that the servo mechanisms not being utilized to establish a drive ratio are to be maintained in their Neutral position.

The disengage valves 78, 80, 82 and 84 are effective to selectively control the Neutral position of the servo mechanisms 162, 190, 212 and 188, respectively. In the spring set position shown for each of the servo disengage valves, the pressure in passage 66 is directed to the respective servos. Valve spool 216 directs pressure to passage 226 which is connected between the pistons 260 and 264 to enforce separation of the pistons 260, 264 to the spring set positions, which is, as previously described, the Neutral position.

Passage 234 of the fourth servo disengage valve 80 is connected to the spring chamber on the servo valve mechanism 190 to enforce the spring set or Neutral position of the servo mechanism 190. Passage 242 is supplied with fluid pressure through the fifth servo disengage valve 82 to supply the spring chamber of the fifth servo mechanism 212 to enforce the Neutral position thereof.

Fluid pressure is directed to passage 252 through the 2/R servo disengage valve 84 for delivery to the chamber between the pistons 284 and 290 to enforce separation thereof and place the 2/R servo 188 in the Neutral position.

The 1/3 servo disengage valve 78 can be made inoperative, that is, exhaust the passage 226 by fluid pressure in passage 204 which is utilized to enforce the servo mechanism 162 to the first ratio position, or by fluid pressure in passage 208 which is operable to enforce movement of the servo mechanism 162 to the third position.

The spring set position of the valve 78 is assisted by fluid pressure in passage 92 whenever the manual valve is in Park, Reverse or Neutral, or by fluid pressure in passage 138 which is present whenever the chamber 198 is pressurized, or by fluid pressure in passage 136 which is pressurized whenever the chamber 170 is pressurized. Thus, in all ratios except first and third, the spring 218 of the servo valve receives a pressure boost to assist in maintaining the valve 78 in the spring set position shown.

The fourth servo disengage valve 80 is urged toward the Neutral position shown by the spring 232 and by fluid pressure in passage 90 which pressurized whenever the Reverse drive is selected in the transmission.

Fluid pressure in passages 138 and 136 assist in moving the valve to a position which permits exhausting of the passage 234, thus preventing the disengage valve from controlling the servo 190 to the Neutral position.

The fifth servo disengage valve is urged to the Neutral position by fluid pressure in passage 90 and also by fluid pressure in passage 174 which is pressurized whenever passage 98 is pressurized and solenoid 172 is actuated such that pressure is available in chamber 170.

The 2/R servo disengage valve 84 is urged to disconnect passage 252 from passage 66 whenever fluid pressure is present in passage 136 or in passage 134. The passage 134 is pressurized whenever the chamber 148 of shift valve 128 is pressurized.

The 1/3 servo 162 controls the engagement of first gear and third gear and makes available a central or Neutral position at which neither first nor third gears are achieved. If the chamber 276 is pressurized hydraulically and the other two servo chambers are evacuated, the piston 264 is shifted toward the left overcoming the coil spring 270 thereby thrusting piston 260 upward by pushing through the spring 268. Piston 260 will stop against the cover, thereby causing the shift fork to engage third gear.

If the 1/3 servo disengage chamber between the pistons 260 and 264 is pressurized and the other two chambers are evacuated, then the piston 264 is thrust to the right to stop against the transmission case. Hydraulic pressure also thrusts pistons 264 and 260 apart which positively locates the servo and therefore the shift fork in the Neutral position. Compression springs 270 and 268 positively locate the servo in the Neutral position whenever the engine is not running or when hydraulic pressure is not otherwise available.

If the chamber 262 is pressurized and the other two chambers are evacuated, then piston 260 is thrust to the right overcoming the compression spring 268. Piston 260 will cause the rod 256 to stop against the transmission case, thereby causing the shift fork 254 to positively engage first gear.

In a similar manner, the 2/R servo 188 controls the engagement of second gear and Reverse gear and makes available a controlled disengaged or Neutral position at which neither second nor Reverse gears are achieved.

The fourth servo 190 controls the engagement of fourth gear and makes available a disengaged or Neutral position at which fourth gear is not achieved. If the passage 202 is pressurized and the passage 204 is evacuated, the piston 306 is thrust to the left against the cover, thereby causing the shift fork to positively engage fourth gear. If the passage 234 is pressurized, the piston 306 is thrust to the right against the transmission case and the shift fork is positively located in the spring set or Neutral position.

The compression spring 308 positively locates the servo in the Neutral position whenever the engine is not running or when hydraulic pressure is otherwise not available.

In a similar manner, the fifth servo 212 controls the engagement of fifth gear and makes available a Neutral position at which fifth gear is not achieved.

The four servos are controlled by three shift valves 128, 130, 132. Each shift valve is actuated by respective solenoid valves 149, 172 and 200 which are energized or de-energized according to a shift program which is found in the transmission controller, not shown. Such shift control mechanisms using electronic devices are well known and usually involve either a dedicated digital computer or central processing unit.

The energization schedule for Park, Neutral, Reverse and the five forward speeds is as follows:

| Speed Ratio | Solenoids | | |
|---|---|---|---|
| | 149 | 172 | 200 |
| 1 | On | — | — |
| 2 | On | On | — |
| 3 | — | — | — |
| 4 | — | On | On |
| 5 | — | — | On |
| R | On | On | On |
| P-N | — | — | — |

In first gear, the shift valve 128 is pressure set while the shift valves 120 and 132 are spring set. Pressure in passage 94 and the manual valve 74 is connected to the passage 150 at shift valve 128. Passage 150 is connected to passage 176 at shift valve 130 which passage in turn is connected to passage 204 at shift valve 132. Passage 204 pressurizes the piston 260 in the 1/3 servo 162 thereby achieving first gear.

Passage 178 is closed at shift valve 130 and exhausted at valve portion 272 of the 1/3 servo 162. Passage 154 is exhausted at the shift valve 128 and blocked from passage 96. Passage 156 is blocked from passage 98 at the shift valve 128 and passage 202 is exhausted at the shift valve 132.

Passage 158 is blocked from passage 100 at the shift valve 128 and passage 209 is exhausted at the shift valve 132. Passage 152 is blocked at the shift valve 130 and exhausted at the portion 272 with the 1/3 servo 162. These valve settings and passage controls prevent the operation of the servo mechanisms to any position other than first gear.

In second gear, valves 128 and 130 are disposed in the pressure set position, while shift valve 132 is in the spring set position. Passage 176 is exhausted at the shift valve 130 thereby preventing first gear. Passage 94 from the manual valve 74 is connected to the passage 152 at the shift valve 128 which connects the passage 178 at shift valve 130 which in turn connects the passage 210 at the shift valve 132. Passage 210 pressurizes the piston 290 of the 2/R servo 188 thereby achieving second gear in the transmission.

Passage 96 is blocked at the shift valve 128 and passage 182 is exhausted at the shift valve 130 thereby preventing third gear operation. Passage 98 is blocked at the shift valve 128 and passage 202 is exhausted at the shift valve 132 thereby preventing fourth gear operation. Passage 100 is blocked at the shift valve 128 and passage 204 is exhausted at the shift valve 132 thereby preventing fifth gear operation. Passage 180 is blocked at the shift valve 132 and passage 206 is exhausted at the portion 294 of the 2/R servo 188 thereby preventing Reverse operation.

In third gear, all three shift valves are in the spring set position. That is, all the solenoids are disengaged. Passage 94 is blocked at the shift valve 128, passage 150 is exhausted at the portion 272 of the 1/3 servo 162, thereby preventing first or second operation. Passage 96, from the manual valve 74, is connected to the passage 154 at shift valve 128, which in turn is connected to passage 182 at shift valve 130 which in turn connects to passage 208 at shift valve 132. Passage 208 feeds the piston 264 of the 1/3 servo 162, thereby achieving third gear.

Passage 156 is blocked at the shift valve 130 and passage 202 is exhausted at shift valve 132, thereby preventing the establishment of fourth gear. Passage 209 is exhausted at the shift valve 132 thereby preventing the operation of the fifth servo and preventing fifth gear engagement.

Passage 90 is blocked at shift valve 128 and passage 206 is exhausted at the 1/3 servo portion 272, such that no Reverse gear operation can be attained.

In fourth gear, the shift valve 128 is in the spring set position and shift valves 130 and 132 are in the pressure set position. Passage 94 is blocked at shift valve 128. Passage 204 and 210 are exhausted at portion 310 of the fourth servo 190, such that neither first nor second gear operation can be attained. Passage 154 is blocked at shift valve 130 and passage 208 is exhausted at shift valve 132, thereby preventing third gear operation. Passage 98, in the manual valve 74, is connected to the passage 156 at the shift valve 128, which in turn is connected to the passage 174 to the shift valve 130, which in turn is connected to the passage 202 at the shift valve 132.

Passage 202 supplies fluid pressure to the piston 306 of the fourth servo 190, thereby achieving fourth gear. Passage 158 is blocked at shift valve 130 and passage 184 is exhausted at the portion 310 of the fourth servo 190 thereby preventing fifth gear engagement. Passage 90 is blocked and passage 152 is exhausted at the shift valve 128, thereby preventing Reverse gear engagement.

In fifth gear, shift valves 128 and 130 are in the spring set position and shift valve 132 is in the pressure set position. Passage 94 is blocked at the shift valve 128 and passages 210 and 204 are exhausted at the portion 320 of the fifth servo 212, thus preventing the establishment of first or second gear. Passage 182 is blocked at the shift valve 132 and passage 208 is exhausted at the shift valve 132, thereby preventing third gear selection.

Passage 156 is blocked at the shift valve 130 and passage 174 is exhausted at the shift valve 130 thereby preventing fourth gear establishment. Passage 100, in the manual valve 74, is connected to the passage 158 at shift valve 128, which in turn is connected to the passage 184 at the shift valve 130 which is connected to the passage 209 at the shift valve 132. Fluid pressure in passage 209 is effective to pressurize the piston 316 of the fifth servo 212, thereby achieving fifth gear in the transmission 10.

Passage 90 is blocked at the shift valve 128 and passage 180 is exhausted at the shift valve 130, thereby preventing the establishment of Reverse gear. In Reverse, all three shift valves are in the pressure set position. Passage 178 is blocked at the shift valve 132 and passages 204 and 210 are exhausted at the portion 294 of the 2/R servo 188, thereby preventing first or second operation.

Passage 96 is blocked at shift valve 128 and passage 208 is exhausted at shift valve 132, thereby preventing the establishment of third gear. Passage 98 is blocked at shift valve 128 and passages 156, 174 and 202 are exhausted at the shift valve 128 such that fourth gear cannot be attained.

Passage 100 is blocked at the shift valve 128 and passages 184 and 209 are exhausted at the portion 294 of the 2/R servo 188, such that a fifth gear cannot be established. Passage 90, in the manual valve 74, is connected to the passage 152 at shift valve 128, which in turn is connected to passage 180 at shift valve 130, which in turn is connected to passage 206 at the shift valve 132. Passage 206 supplies fluid pressure to the piston 284 of the 2/R servo 188, thereby establishing the Reverse gear.

As described above, the disengage valves 78, 80, 82 and 84 are effective to establish the Neutral position of the various servo mechanisms. The 1/3 servo disengage valve 78 is positioned by fluid pressure, as previously described, such that when any gear other than first and third is established, the pressure in passage 66 is directed to passage 226 to enforce Neutral in the 1/3 servo.

In a similar manner, the fourth disengage valve 80 will prevent the enforcement of Neutral in the fourth servo 190 whenever the fourth ratio is commanded by the transmission control, but will enforce Neutral in all other conditions. The fifth servo disengage valve 82 will enforce Neutral position in the fifth servo 212 when the transmission control demands operation in any gear ratio other than fifth, and the second servo disengage valve 84 will enforce Neutral in the 2/R servo 188 whenever a drive ratio other than second or Reverse is commanded by the control mechanisms.

It should also be apparent from the above description, that secondary passage controls which provide for the exhausting of the servo feed passages for the various servo mechanisms also cooperate to prevent the establishment of the drive ratio other than the one which the control wishes to have established at a particular time.

It should also be appreciated that the manual valve 74 can be manipulated in the second through fifth position to prevent upshifting to the higher drive ratios by simply positioning the manual valve to a lower drive ratio maximum. For example, if the drive selects the D3 position, the shift control system cannot shift the transmission to the fourth or fifth ratio. The manual valve would limit the system to third as the highest ratio obtainable.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. In combination, a transmission and control comprising:

a plurality of synchronizer clutch means for selectively establishing a plurality of speed ratios between an input shaft and an output shaft;

first servo means selectively movable to a first position, second position and neutral position for operating a first of said synchronizer clutch means to establish a first ratio, a second ratio and a neutral condition, respectively, and including a neutral pressure chamber;

second servo means selectively movable to a first position, second position and neutral position for operating a second of said synchronizer clutch means to establish a third ratio, a fourth ratio and a neutral condition, respectively, and including a neutral pressure chamber;

servo disengage valve means for selectively supplying fluid pressure to the neutral pressure chambers for individually controlling each of said servo means into the neutral condition;

shift valve means for selectively conditioning one of the servo means to a respective ratio condition and for controlling the servo disengage valve means to establish the neutral condition in the other of the servo means; and means for establishing and directing pressurized fluid to said servo means and said servo disengage valve means and said neutral chambers being selectively pressurized to selectively enforce the neutral condition.

2. The combination defined in claim 1 further comprising:
third servo means including a neutral pressure chamber and being selectively movable to a first position and a neutral position for operating a third of said synchronizer clutch means to establish a fifth ratio and a neutral condition.

3. The combination defined in claims 2, wherein each servo means has valve means responsive to the position thereof for preventing pressurized fluid distribution to selected ones of the other servo means when a condition other than neutral has been selected in one of the servo means.

4. In combination, a transmission and control comprising:
a source of fluid pressure;
a plurality of synchronizer clutch means for selectively establishing a plurality of speed ratios between an input shaft and an output shaft;
first servo means having a neutral control chamber and being selectively movable to a first position, second position and neutral position for operating a first of said synchronizer clutch means to establish a first ratio, a second ratio and a neutral condition, respectively;
second servo means having a neutral control chamber and being selectively movable to at least a first position, and a neutral position for operating a second of said synchronizer clutch means to establish a third ratio and a neutral condition, respectively;
servo disengage valve means for selectively directing fluid pressure from said source to respective ones of the neutral control chambers to enforce controlling each of said servo means into the neutral condition; and
shift valve means for selectively conditioning each of the servo means individually to a respective ratio condition and for simultaneously controlling the servo disengage valve means to establish the neutral condition in the other of the servo means.

5. The combination defined in claim 4 further comprising:
third servo means having a neutral pressure chamber and being selectively movable to a first position and a neutral position for operating a third of said synchronizer clutch means to establish a fourth ratio and a neutral condition.

6. The combination defined in claim 5 further comprising:
fourth servo means having a neutral pressure chamber and being selectively movable to a first position, second position and neutral position for operating a fourth of said synchronizer clutch means to establish a fifth ratio, a sixth ratio and a neutral condition, respectively;
wherein one of the ratios is a reverse ratio.

7. In combination, a transmission and control comprising:
a plurality of synchronizer clutch means for selectively establishing a plurality of speed ratios between an input shaft and an output shaft;
first servo means including a neutral control chamber and being selectively movable to a first position, second position and neutral position for operating a first of said synchronizer clutch means to establish a first ratio, a second ratio and a neutral condition, respectively;
second servo means including a neutral control chamber and being selectively movable to a first position, second position and neutral position for operating a second of said synchronizer clutch means to establish a third ratio, a fourth ratio and a neutral condition, respectively;
third servo means including a neutral control chamber and being selectively movable to at least a first position and a neutral position for operating a third of said synchronizer clutch means to establish a fifth ratio and a neutral condition;
servo disengage valve means for selectively individually controlling each of said servo means into the neutral condition by selectively directing fluid pressure to the respective neutral control chambers;
shift valve means for selectively conditioning one of the servo means to a respective ratio condition and for controlling the servo disengage valve means to establish the neutral condition in the other of the servo means;
valve means controlled by each of said servo means for hydraulically preventing operation of the at least one of the other servo means when the respective valve means is actuated by the controlling servo means; and
a source of fluid pressure selectively conducted to said servo means, said valve means and said servo disengage valve means.

8. The combination defined in claim 7 further comprising:
fourth servo means including a neutral control chamber and being selectively movable to at least a first position and a neutral position for operating a fourth of said synchronizer clutch means to establish a sixth ratio and a neutral condition.

* * * * *